Patented Apr. 6, 1937

2,076,459

UNITED STATES PATENT OFFICE 2,076,459

PROCESS FOR CANNING CITRUS AND OTHER JUICES

James Hanson, Sunnyvale, Calif., assignor to Libby, McNeill & Libby, Chicago, Ill., a corporation of Maine No Drawing. Application November 6, 1934, Serial No. 751,787

2 Claims. (Cl. 99—155)

The invention relates to a process for canning orange, lemon and grapefruit juices and other juices.

The object of the present invention is to prevent the formation of objectionable terpenes, cooked and other abnormal flavors so common and objectionable in fresh and canned citrus juices and to enable the original flavor to hold for prolonged periods in the can and also after the can is opened.

A further object of the invention is to eliminate from the juice oxygen which is a factor in the production of foreign and unnatural flavors and at the same time to prepare the juices for the sorption of nitrogen or hydrogen gas which prevents the formation of abnormal flavors.

Another object of the invention is to enable the nitrogen or hydrogen gas to be sorbed throughout the juice and to reach all particles of the juice and enter into combination with the organic substances of citrus juices.

The process for canning citrus and other juices consists of the following steps:

The juice is extracted from the fruit by burring in the usual manner and by mechanism of the ordinary construction.

The extracted juice is screened preferably through a one-eighth inch mesh screen and is then screened a second time through a three-hundredth inch mesh screen to remove pulp, seed and a portion of the fiber, the objectionable portion of the fiber, and give the juice a smooth appearance. Both the burring and the straining equipment should be constructed of stainless steel.

After extraction and straining, the juice is cooled to 40° F., then sucked, sprayed or otherwise introduced into vacuum tanks and deaerated at a high vacuum, preferably twenty-nine inches for a sufficient period of time to completely deaerate the juice. The time required depends on the amount of air present and the volume of juice being run through the plant. Ordinarily this deaerating step of the process may be performed in about ten minutes, that is the juice product is subjected to the high vacuum for a period of ten minutes. The equipment employed is of stainless steel.

The oxygen is removed for the reason that its presence is a contributing factor in the production of foreign flavors and its removal not only eliminates the foreign flavors but prepares the juice for the sorption of nitrogen or hydrogen gas. The sorption of nitrogen or hydrogen gas prevents the formation of unnatural flavors. The greater the deaeration of the juice product the more nitrogen or hydrogen gas will be sorbed by the same, and a maximum sorption of nitrogen or hydrogen gas will produce a juice product which will hold for a longer period of time than the juice product where less nitrogen gas is sorbed.

After deaeration the vacuum is broken with washed nitrogen or hydrogen gas and the deaerated juice while in the vacuum tanks is then subjected to a heavy pressure of either of said gases. The heavier the pressure and the longer the time the juice is subjected to the said gas pressure the better are the results obtained. The pressure and the time should be such as to cause the said gas to reach all particles of the juice.

The nitrogen or hydrogen gas under heavy pressure by means of sorption enters into solution in the juice and into combination with the organic substances in the orange or other citrus juices and prevents by this method the formation of abnormal flavors which these organic substances will produce unless processed in this manner. A pressure of nitrogen or hydrogen gas of at least a hundred pounds to the square inch will be required to accomplish the maximum result if the deaerated juice is subjected to such pressure for a period of about ten minutes but both the pressure of the nitrogen or hydrogen gas and the time period may be varied.

After charging the juice with nitrogen or hydrogen gas the juice is forced through a filler, canned under a nitrogen or hydrogen gas atmosphere and vacuum sealed.

After canning, the juice product is sterilized at a temperature of 160 degrees for a sufficient length of time to raise the temperature of the entire contents of the can from the sides to the center thereof to such sterilizing temperature. After sterilization the juice is immediately cooled to a cold temperature.

While the steps of the process as explained are deemed preferable, it will be understood that slight variations therein may be requisite in treating juices of different kinds of fruits and vegetables while the specific process described is applicable to citrus fruit juices and any such variations within the scope of the claims would not involve a departure from the present invention.

What is claimed is:

1. The herein described process for canning citrus fruit juices and other juices consisting in extracting the juice, sucking the juice into a vacuum tank and deaerating the same under a high vacuum, breaking the vacuum with nitrogen gas after substantially complete deaeration of the juice, subjecting the nitrogen treated juice while in a tank to a heavy nitrogen gas pressure within the range of 50 to 100 pounds to the square inch and sufficient to cause the nitrogen gas to reach all particles of the juice and enter into combination with the juice to prevent formation of abnormal flavors in the canned juice, canning the juice in a nitrogen gas atmosphere, and vacuum sealing the can.

2. The herein described process for canning citrus fruit juices and other juices consisting in extracting the juice, chilling the extracted juice, sucking the juice into a vacuum tank and deaerating the same under a high vacuum, breaking the vacuum with nitrogen gas after substantially complete deaeration of the juice, subjecting the nitrogen treated juice while in a tank to a heavy nitrogen gas pressure within the range of 50 to 100 pounds to the square inch and sufficient to cause the nitrogen gas to reach all particles of the juice and enter into combination with the juice to prevent formation of abnormal flavors in the canned juice, canning the juice in a nitrogen gas atmosphere, and vacuum sealing the can.

JAMES HANSON.